(12) United States Patent
Chang (10) Patent No.: US 6,559,797 B1
(45) Date of Patent: May 6, 2003

(54) OVERLAPPING SUBARRAY PATCH ANTENNA SYSTEM

(75) Inventor: Donald C. D. Chang, Thousand Oaks, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/973,269

(22) Filed: Oct. 5, 2001

Related U.S. Application Data
(60) Provisional application No. 60/266,689, filed on Feb. 5, 2001.

(51) Int. Cl.[7] .................................................. H01Q 3/26
(52) U.S. Cl. ...................................................... 342/368
(58) Field of Search ................................. 342/368, 375

(56) References Cited

U.S. PATENT DOCUMENTS

| | | | |
|---|---|---|---|
| 2,470,787 A | 5/1949 | Nosker | 342/12 |
| 3,384,891 A | 5/1968 | Anderson | 343/6.5 |
| 3,541,553 A | 11/1970 | Gubin | 343/100 |

(List continued on next page.)

FOREIGN PATENT DOCUMENTS

| | | | | |
|---|---|---|---|---|
| EP | 0335 558 | | 4/1989 | |
| EP | 1161001 A2 | * | 12/2001 | H04B/7/08 |
| GB | 2271 902 A | | 10/1993 | |
| GB | 2306 827 A | | 5/1997 | |
| JP | 2-28580 | | 1/1990 | |
| JP | 3-291584 | | 12/1991 | |
| JP | 4-27887 | | 1/1992 | |
| JP | 07146995 A | | 6/1995 | |
| JP | 08015405 A | | 1/1996 | |
| JP | 09026328 | | 1/1997 | |
| JP | 09113600 A | | 5/1997 | |
| JP | 10090391 A | | 4/1998 | |
| JP | 2001345747 A | * | 12/2001 | H04B/7/08 |
| WO | WO 97/07609 | | 2/1997 | |

OTHER PUBLICATIONS

US Provisional Application 60/266,689.*
Teles J. et. al, "Overview of TDRSS" Orbit Determination and Analysis, PSD Meeting, Cospar Technical Panel on Satellite Dynamics, 13th Cospar Scientific Assembly, Hamburg, Germany, Jul. 11–21, 1994, Advances in Space Research, pp. 67–76.
Bricker, P. et. al, "Integrated Receiver for NASA Tracking and Data Relay Satellite System", MILCOM 90, A New Era, 1990 IEEE Military Communications Conference, Monterey, CA USA, Sep. 30–Oct. 3, 1990, pp. 1–5.
Dunham, J. B. et. al, "Onboard Orbit Estimation with Tracking and Data Relay Satellite System Data", Journal of Guidance, Control and Dynamics, Jul.–Aug. 1983, USA, col. 6 NR.4, pp. 292–301.
Bethke,K.H., A Novel Noncooperative Near–Range Radar Network For Traffic Guidance and Control on Airport Surfaces, IEEE Transactions on Control Systems Technology, vol. 1, No. 3, Sep. 1993.

(List continued on next page.)

*Primary Examiner*—Thomas H. Tareza
*Assistant Examiner*—Fred H Mull
(74) *Attorney, Agent, or Firm*—V. D. Duraiswamy; M. W. Sales (57) ABSTRACT

A high altitude communication device is provided using a first array element comprising a plurality of patches and a second array element comprising a plurality of patches. The first array element and the second array element are for receiving communication signals. A patch in the first array element is shared by the second array element. At least one grouping network selects the first array element for a first time interval and selects the second array element for a time interval after the first time interval to convert and form digital combined signals from the communication signals. A method of digitally controlling received signals within a high altitude communication device is also provided.

18 Claims, 5 Drawing Sheets

U.S. PATENT DOCUMENTS

| | | | |
|---|---|---|---|
| 3,544,995 A | 12/1970 | Bottenberg et al. | 342/46 |
| 3,720,953 A | 3/1973 | Ajioka | 343/771 |
| 4,161,730 A | 7/1979 | Anderson | |
| 4,161,734 A | 7/1979 | Anderson | 343/100 |
| 4,359,733 A | 11/1982 | O'Neill | 343/6.5 |
| 4,613,864 A | 9/1986 | Hofgen | 343/357 |
| 4,635,063 A | 1/1987 | Chang et al. | 342/380 |
| 4,819,227 A | 4/1989 | Rosen | 370/75 |
| 4,897,661 A | 1/1990 | Hiraiwa | 342/457 |
| 4,979,170 A | 12/1990 | Gilhousen et al. | 370/104.1 |
| 4,994,809 A | 2/1991 | Yung et al. | 342/108 |
| 5,006,855 A | 4/1991 | Braff | 342/357 |
| 5,017,927 A | 5/1991 | Agrawal et al. | 342/371 |
| 5,077,562 A | 12/1991 | Chang et al. | 342/368 |
| 5,099,245 A | 3/1992 | Sagey | 342/357 |
| 5,111,209 A | 5/1992 | Toriyama | 342/357 |
| 5,126,748 A | 6/1992 | Ames et al. | 342/353 |
| 5,151,706 A * | 9/1992 | Roederer et al. | 342/372 |
| 5,218,619 A | 6/1993 | Dent | 375/1 |
| 5,233,626 A | 8/1993 | Ames | 375/1 |
| 5,278,863 A | 1/1994 | Briskman | 375/1 |
| 5,319,673 A | 6/1994 | Briskman | 375/1 |
| 5,387,916 A | 2/1995 | Cohn | 342/44 |
| 5,410,314 A | 4/1995 | Frush et al. | 342/26 |
| 5,444,450 A | 8/1995 | Olds et al. | 342/357 |
| 5,485,485 A | 1/1996 | Briskman et al. | 375/200 |
| 5,525,995 A | 6/1996 | Benner | 342/90 |
| 5,550,809 A | 8/1996 | Bottomley et al. | 370/18 |
| 5,555,257 A | 9/1996 | Dent | 370/95.1 |
| 5,572,216 A | 11/1996 | Weinberg et al. | 342/357 |
| 5,592,471 A | 1/1997 | Briskman | 455/52.3 |
| 5,594,941 A | 1/1997 | Dent | 455/13.4 |
| 5,612,701 A | 3/1997 | Diekelman | 342/354 |
| 5,644,572 A | 7/1997 | Olds et al. | 370/324 |
| 5,739,785 A | 4/1998 | Allison et al. | 342/357 |
| 5,764,187 A * | 6/1998 | Rudish et al. | 342/372 |
| 5,790,070 A | 8/1998 | Natarajan et al. | 342/354 |
| 5,810,284 A | 9/1998 | Hibbs et al. | 244/13 |
| 5,856,804 A | 1/1999 | Turcotte et al. | 342/371 |
| 5,864,579 A | 1/1999 | Briskman | 375/200 |
| 5,903,549 A | 5/1999 | Von der Embse et al. | 370/310 |
| 5,909,460 A | 6/1999 | Dent | 375/200 |
| 5,917,447 A | 6/1999 | Wang et al. | 342/383 |
| 5,920,284 A | 7/1999 | Victor | 342/357.01 |
| 5,944,770 A | 8/1999 | Enge et al. | 701/707 |
| 5,945,948 A | 8/1999 | Buford et al. | 342/457 |
| 5,949,766 A | 9/1999 | Ibanez-Meier et al. | 370/316 |
| 5,969,674 A | 10/1999 | Von der Embse et al. | 342/357.17 |
| 5,973,647 A | 10/1999 | Barrett et al. | 343/713 |
| 6,018,316 A * | 1/2000 | Rudish et al. | 342/368 |
| 6,020,845 A | 2/2000 | Weinberg et al. | 342/354 |
| 6,105,060 A | 8/2000 | Rothblatt | 709/219 |
| 6,111,542 A | 8/2000 | Day et al. | 342/359 |
| 6,138,012 A | 10/2000 | Krutz et al. | 455/427 |
| 6,147,658 A | 11/2000 | Higashi et al. | 343/853 |
| 6,151,308 A | 11/2000 | Ibanez-Meier et al. | 370/316 |
| 6,173,178 B1 | 1/2001 | Hammill et al. | 455/429 |
| 6,266,528 B1 * | 7/2001 | Farzaneh | 342/372 |
| 2001/0048389 A1 * | 12/2001 | Nakagawa | 342/378 |

OTHER PUBLICATIONS

Doc 9524 FANS/4–WP/76, International Civil Aviation Organization, Special Committee on Future Air Navigation Systems, Fourth Meeting, Montreal, May 2–20, 1988, Report, pp. 3.2B–2 & 3.2B–3.

Suzuki, R. et. al, :Mobile TDM/TDMA System With Active Array Antenna, Global Telecommunications Conference, 1991; Globecom '91, vol. 3, Dec. 2–5, 1991, pp. 1569–1573.

Chan, K. K., et. al, "A CIRCULARLY POLARIZED WAVEGUIDE ARRAY FOR LEO SATELLITE COMMUNICATIONS", Antennas and Propagation Society, 1999, IEEE International Symposium, vol. 1, Jul. 11–16, 1999, pp. 154–157.

Oodo, M., et. al, "ONBOARD DBF ANTENNA FOR STRATOSPHERIC PLATFORM", 2000 IEEE International Conference on Phased Array Systems and Technology, Proceedings, May 21–25, 2000, pp. 125–128.

Yokosuka Research Park, "THE FIRST STRATOSPHERIC PLATFORM SYSTEMS WORKSHOP", May 12–13, 1999, pp. 1–216.

Chiba, Isamu et. al, "Digital Beam Forming (DBF) Antenna System for Mobile Communications", IEEE AES Systems Magazine, Sep. 1997, pp. 31–41.

Miura, Ryu et. al, "A DBF Self–Beam Steering Array Antenna for Mobile Satellite Applications Using Beam–Space Maximal–Ratio Combination", IEEE Trans. On Vehicular Technology, vol. 48, No. 3, May 1999, pp. 665–675.

Sato, Kazuo et al., "Development And Field Experiments of Phased Array Antenna For Land Vehicle Satellite Communications", IEEE Antennas and Propagation Society International Symposium, 1992, Jul. 1992, pp. 1073–1076.

Sakakibara, Kunio et. al, "A Two–Beam Slotted Leaky Waveguide Array for Mobile Reception of Dual–Polarization DBS", IEEE Transactions on Vehicular Technology, vol. 48, No. 1, Jan. 1999, pp. 1–7.

U.S. patent application Ser. No. 09/611,753, Chang et al., filed Jul. 7, 2000, (Pending Pat. App.).

* cited by examiner

OVERLAPPING SUBARRAY PATCH ANTENNA SYSTEM

This application claims the priority and benefit of U.S. Provisional Application No. 60/266,689, filed Feb. 5, 2001, for "Digital Controlled Overlapping Subarray For Improved Axial Ratio", inventor: Donald C. D. Chang, which application is incorporated by reference herein.

TECHNICAL FIELD

The present invention relates generally to multiple beam communication systems and more particularly, to a method and apparatus for digitally controlling a received signal that is manipulated by a digital beam former.

BACKGROUND OF THE INVENTION

Current commercial high altitude communication devices having conventional multiple beam architectures, which use multipatch antennas, incorporate digital beam forming (DBF) techniques. Multipatch antennas receive and convert communication signals into received signals. Multipatch antennas are also very useful in forming multiple simultaneous beams covering a large field of view (FOV).

Figure 1:
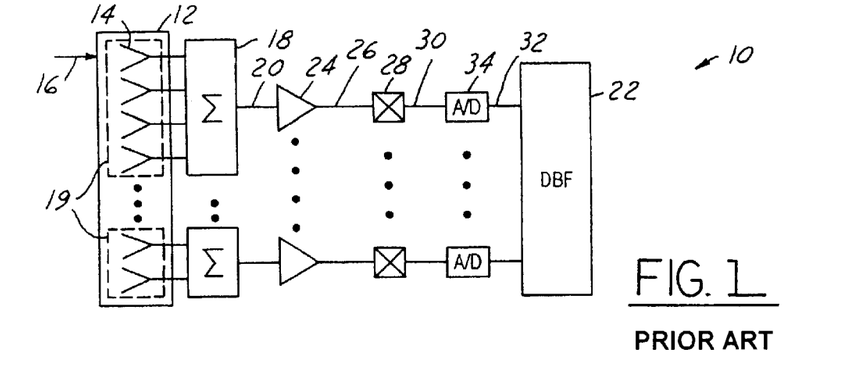
FIG. 1 is a block diagrammatic view of a receiving circuit of a conventional high altitude communication device.

Now referring to FIG. 1, a block diagrammatic view of a receiving circuit 10 of a conventional high altitude communication device is shown. Typical mobile satellite payloads have a multipatch antenna 12. The multipatch antenna 12 includes a plurality of patches 14, each patch 14 receives communication signals 16. Each patch 14 is preferably used only once in receiving communication signals 16 to prevent signal to noise degradation.

The configurations of the patches 14 affect the optimization of multipatch antenna axial ratio (AR). Typical multipatch antennas usually have a poor AR. With a good design, 2 db AR over a large FOV is commonly accepted. For limited FOV applications such as a geosynchronous orbit satellite, grouping patches 14 with proper orientation significantly improves the AR to 0.2 db or less.

Orientations of the patches 14 also affect the amount of created grating lobes. The patches 14 have element patterns. When element patterns overlap grating lobes are created. Grating lobes reduce multipatch antenna directivity and gain as known in the art.

The patches 14 are combined in even numbered groups by combining networks 18 to form array elements 19. The combining networks 18 convert the communications signals 16 into combined signals 20. Each combining network 18 is connected to several components for signal-conditioning the combined signals 20 prior to connecting to a digital beam former 22. The combining networks 18 are connected to a plurality of low noise amplifiers (LNAs) 24, which amplify the combined signals 20 to form received signals 26. The LNAs 24 are connected to a plurality of downconverters 28. The downconverters 28 convert the high frequency received signals 26 to baseband or intermediate frequency (IF) signals 30. The baseband signals 30 are then transformed into digital signals 32 by analog-to-digital (A/D) converters 34.

Figure 2:
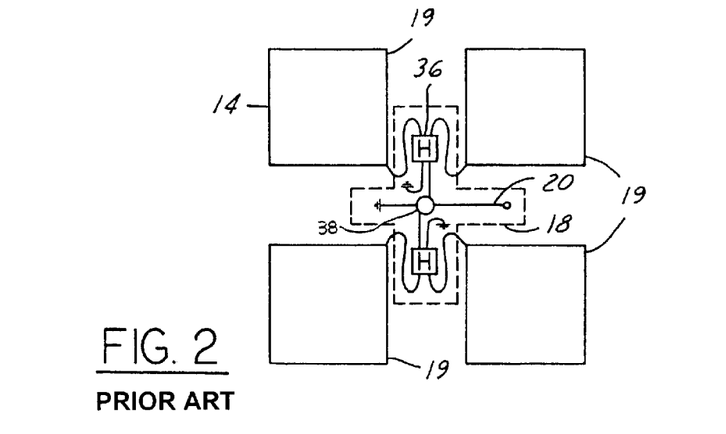
FIG. 2 is a schematic view of an array element in conjunction with a combining network of a conventional high altitude communication device.

Now referring to FIG. 2, a schematic view of sample array element 19 and a combining network 18, which together optimize axial ratio and prevent grating lobes is shown. The communication signals 16 are received by patches 14 and combined by 3 db hybrids 36 and circular ring hybrids 38 to form the combined signals 20. The patches 14 are oriented 90° in sequence. The 3 db hybrids 36 are at 90° and the circular ring hybrids 38 are at 180°. The 3db hybrids 36 and the circular ring hybrids 38 cause signal losses due to their internal characteristics.

Figure 3:
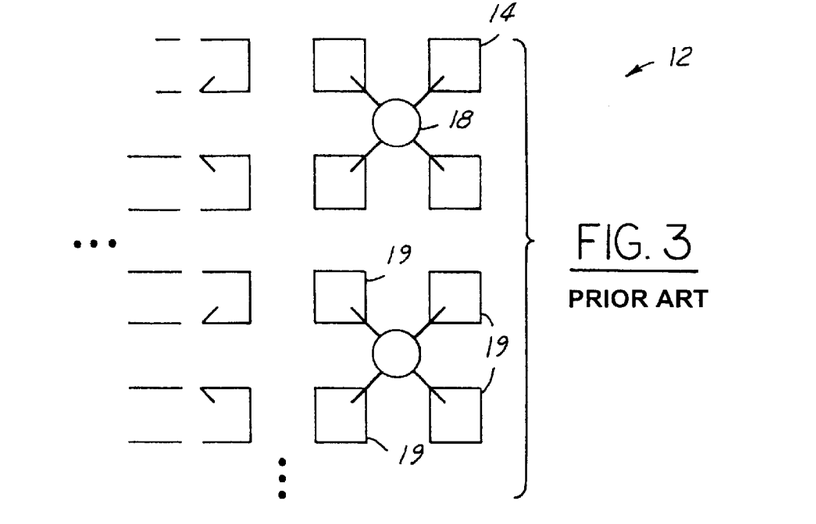
FIG. 3 is a block diagrammatic view of a multipatch antenna of a conventional high altitude communication device showing positioning of array elements.

Now referring to FIG. 3, a block diagrammatic view of the multipatch antenna 12 showing the positioning of the array elements 19 is shown. The patches 14 are positioned to minimize overlapping of element patterns, thereby, suppressing grating lobes and maximizing gain. By orienting the patches 14 and array elements 19 so that spacing between patches 14 is approximately equal to half the wavelength of the received signal 26 and spacing between array elements 19 is approximately equal to the wavelength of the received signal 26, grating lobes can be prevented.

In high altitude communication devices there is a continuing effort to decrease the amount of components in the system thereby decreasing the size and weight of the system, decreasing hardware, decreasing costs, decreasing power consumption, and increasing efficiency.

In space systems, where up to thousands of array elements may be used, a reduction in satellite payload components may cause tremendous savings. In other communication systems, in which many array elements are used the savings in cost, weight, and power will also be increased.

Therefore a need exists to reduce the number of components in the high altitude communication device. Also a need exists to produce a high altitude communication device having zero grating lobes, good axial ratio, and a reduced amount of signal loss over existing high altitude communication device.

SUMMARY OF THE INVENTION

The forgoing and other advantages are provided by a method and apparatus of digitally controlling a received signal within a high altitude communication device. The high altitude communication device uses a first array element comprising a plurality of patches and a second array element comprising a plurality of patches. The first array element and the second array element are for receiving communication signals. A patch in the first array element is shared by the second array element.

A method of digitally controlling received signals within a high altitude communication device is provided. The method includes clocking an array element and receiving communication signals. The communication signals are converted to digital baseband signals by the plurality of grouping networks. The plurality of grouping networks also transforms the digital baseband signals into digital combined signals.

The present invention has several advantages over existing signal controlling techniques. One advantage of the present invention is that it reduces the number of high altitude communication device components by eliminating the use of hybrids and combining networks. The reduction in components reduces weight and saves space within a high altitude communication device. Furthermore, the reduction in components reduces costs involved in production and implementation of satellite systems.

Another advantage of the present invention is that it minimizes signal losses due to the elimination of the hybrids and combining networks.

Yet another advantage of the present invention is that an arbitrary number of patches may be grouped together as opposed to a fixed hardwired even amount of patches.

Moreover, the present invention eliminates grating lobes and optimizes the high altitude communication device axial ratio. The present invention also reduces A/D dynamic range requirements and may be easily calibrated and recalibrated.

Therefore, a high altitude communication device having a minimal number of components, which can digitally control received signals, is possible due to the stated method advantages. The present invention itself, together with further objects and attendant advantages, will be best understood by reference to the following detailed description, taken in conjunction with the accompanying drawing.

BRIEF DESCRIPTION OF THE DRAWING

For a more complete understanding of this invention reference should now be had to the embodiments illustrated in greater detail in the accompanying figures and described below by way of example.

In the figures.

DETAILED DESCRIPTION OF THE PREFERRED EMBODIMENT

The present invention may be applied in various applications such as a fixed satellite service communication system, general packet radio service, universal mobile telecommunication system, or other terrestrial mobile communication applications. The present invention may also be incorporated into communication systems using various payload designs such as a low profile array, a surface mount antenna, or a digital design.

While the present invention is described with respect to a method and apparatus for digitally controlling a received signal for a multiple beam high altitude communication device, the following sampling method is capable of being adapted for various purposes and is not limited to the following applications: a ground based base-station, mobile terminal, mobile satellite, or any other electronic or communication device.

In the following figures the same reference numerals are used to refer to the same components. Also in the following description, various operating parameters and components are described for one constructed embodiment. These specific parameters and components are included as examples and are not meant to be limiting.

Figure 4:
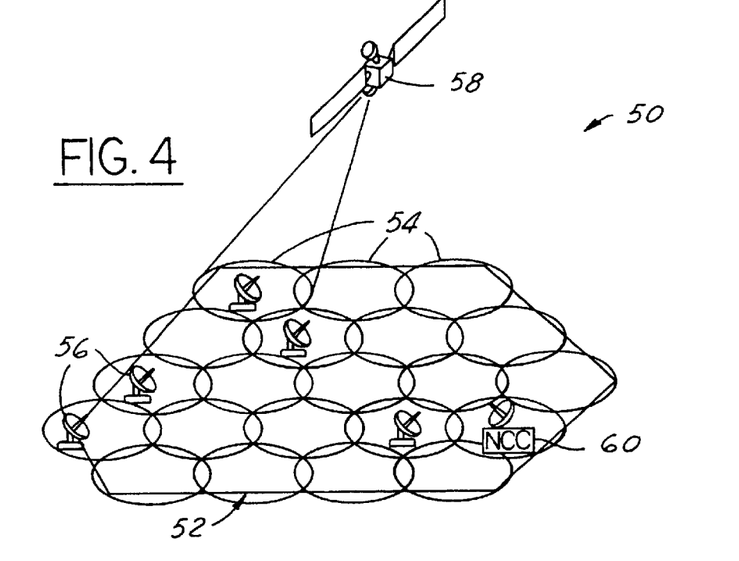
FIG. 4 is a perspective view of a communication system, utilizing a method and apparatus for sampling communication signals according to the present invention.

Referring now to FIG. 4, a communication system 50 is shown including a total service geographic area 52 covered by a relatively large number of uplink and downlink spot beams having individual foot-prints 54. High gain uplink and downlink beams are preferably utilized to support mobile terminals 56, with high-data-rate transmission. More importantly, the combination of uplink and downlink beams provides for multiple reuse of the same limited frequency spectrum by a high altitude communication device 58, thus creating a high-capacity mobile communication system 50 which can serve mass markets for numerous communication services. High altitude communication device 58 may be a satellite, a stratospheric platform or other communication device. The uplink and downlink spot beams may be generated or radiated from the high altitude communication device 58 or by a cell tower 59. A network control center (NCC) 60 provides overall transmission control and uplink/downlink frequency assignment for the mobile terminals 56, the high altitude communication device 58, and cell tower 59.

Figure 5:
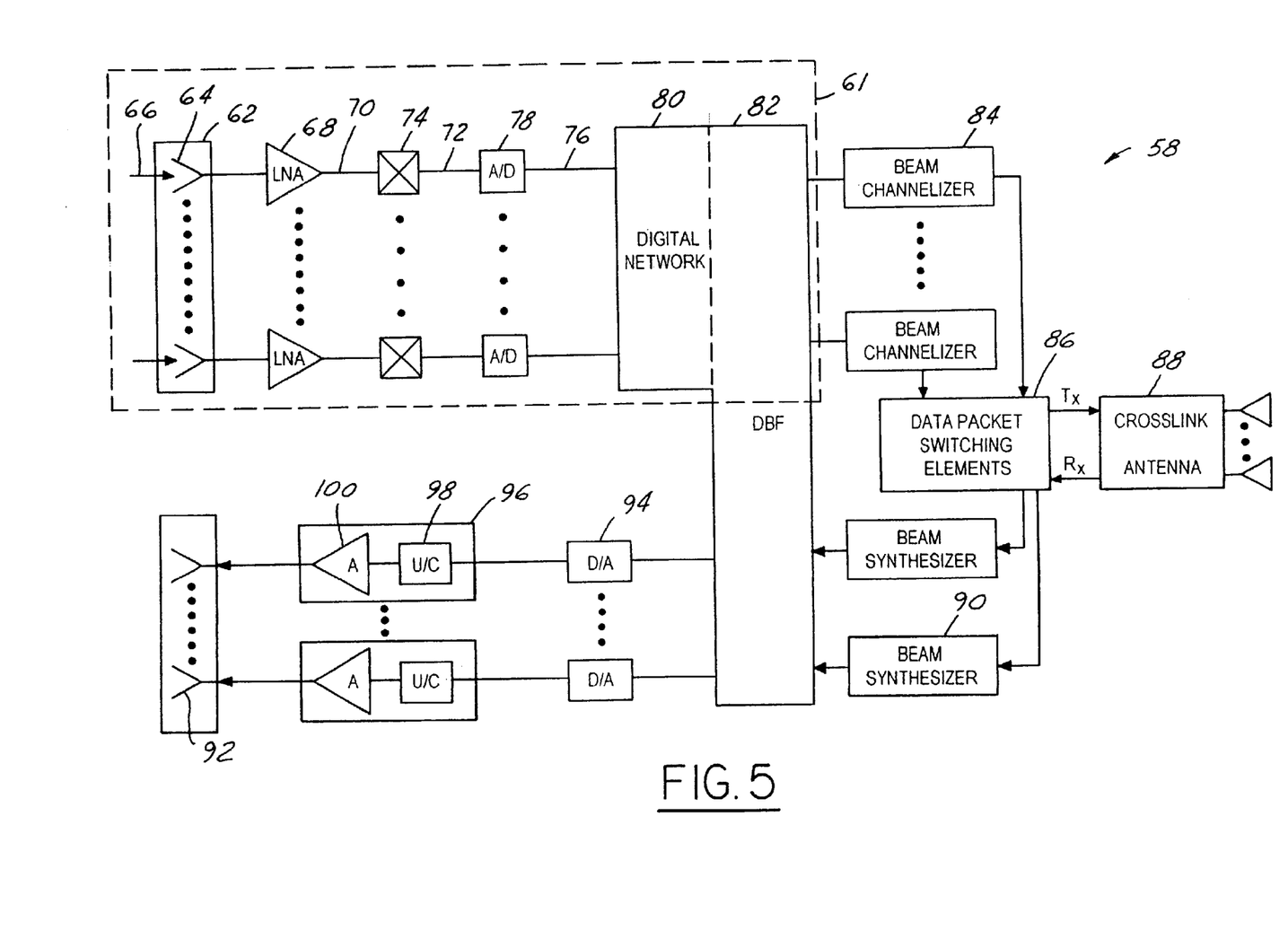
FIG. 5 is a block diagrammatic view of a high altitude communication device in accordance with the present invention.

Referring now to FIG. 5, a high altitude communication device 58 utilizing one embodiment of the present invention is shown. The communication device 58 includes a receiving circuit 61 with a multipatch antenna 62. The multipatch antenna 62 has a plurality of patches 64 for collecting communication signals 66. The communication signals 66 are amplified by a plurality of low noise amplifiers (LNAs) 68 to form received signals 70. The received signals 70 are converted to baseband signals 72 by a plurality of down-converters 74. The baseband signals 72 are transformed into digital signals 76 by a plurality of analog-to-digital (A/D) converters 78. The A/D converters 78 transfer the digital signals to a digital network 80, which is part of a digital beam former (DBF) 82. Although the digital network 80 is shown as part of an integrated circuit within the DBF 82, it may be a separate individual component or group of components. The DBF 82 forms separate beams with different directional vectors to accommodate various communication signals 16 arriving from different directions or different transmitting devices. The DBF 82 transfers the beams to beam channelizers 84, which transform the digital signals including amplitude and phase information into digital data streams. The beam channelizers 84 provide the digital stream over to data packet switch elements 86. The data packet switch elements 86 packetize the data streams and the packets are transmitted accordingly over crosslink antennas 88. The crosslink antennas 88 transmit signals to and receive signals from other mobile satellite payloads. The data packet switch elements 86 also provide a data stream representing one individual antenna beam to each beam synthesizer module 90. Beam synthesizer modules 90 convert the data streams to digital output signals that represent the analog waveforms that are transmitted. The beam synthesizer 90 couples the digital output signals to the DBF 82. The DBF 82 determines proper signal weights for each patch 64 and transmit radiating element 92. The DBF 82 analyzes incoming signals using a suitable algorithm and determines proper signal weights. The weighted analog transmitting signals are converted to a digital signal by a digital-to-analog (D/A) converter 94. The D/A converter 94 transforms the digital output signals for each patch 64 into corresponding analog signals for each transmit radiating element 92. The D/A converter 94 transfers the analog signals to a plurality of transmitter modules 96. The transmitter modules 96 have two components, an upconverter 98, and an amplifier 100. The analog signals are converted, via the upconverter 98 and the amplifier 100, into suitable signals for transmission to the earth station terminals 56.

Figure 6:
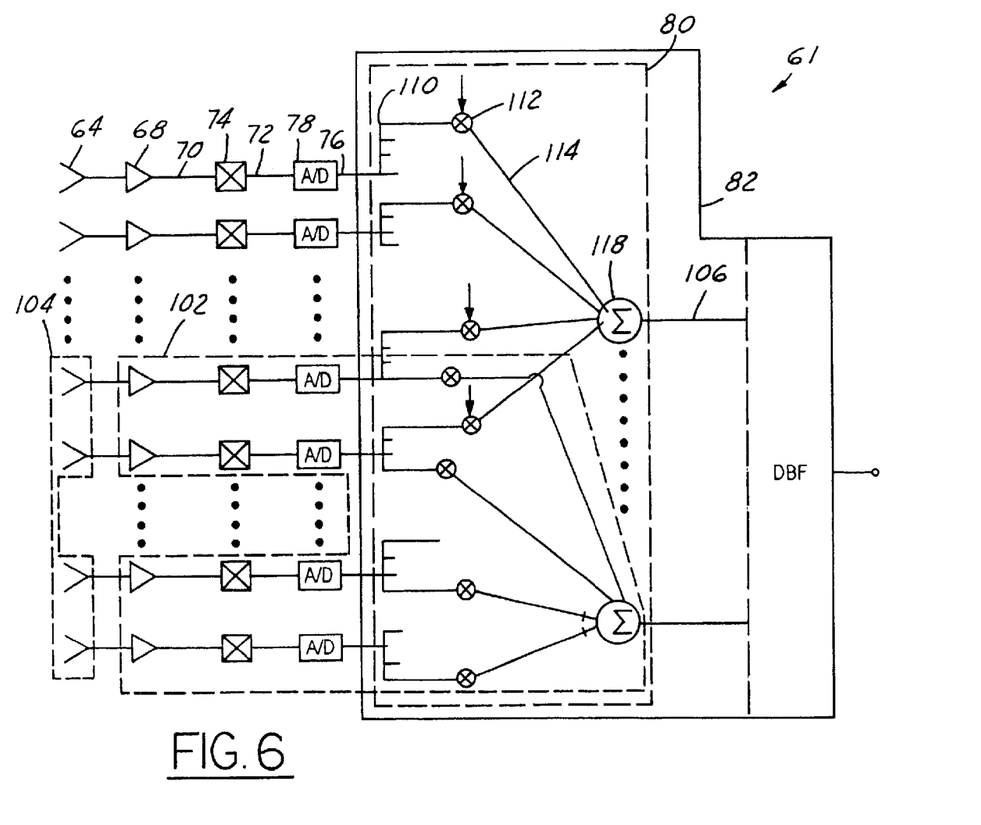
FIG. 6 is a block diagrammatic view of a receiving circuit of a high altitude communication device in accordance with the present invention.

Referring now also to FIG. 6, a block diagrammatic view of a receiving circuit 61 of the present invention is shown. Each patch is part of an array element 104 having a preselected arbitrary number of patches 64. The digital network 80 in combination with the LNAs 68, downconverters 74, and A/D converters 78 form grouping networks 102. Each array element 104 transfers communication signals 16 to a grouping network 102. The digital network 80 transforms digital baseband signals 76 into combined signals 106. The digital baseband signals 76 are transferred to strip-lines 110 within the digital network 80 of the DBF 82. The strip-lines 110 separate a preselected arbitrary number of digital baseband signals 76, which are transferred to polarizers 112. The polarizers 112 convert the digital baseband signals 76 into polarized signals 114. The polarized signals 114 are dynamically controlled and may invert the digital baseband signal 76 depending on location of a corresponding patch 64. A preselected arbitrary number of polarized signals 114 are then summed to form digital combined signals 106 by elements 118.

Figure 7:
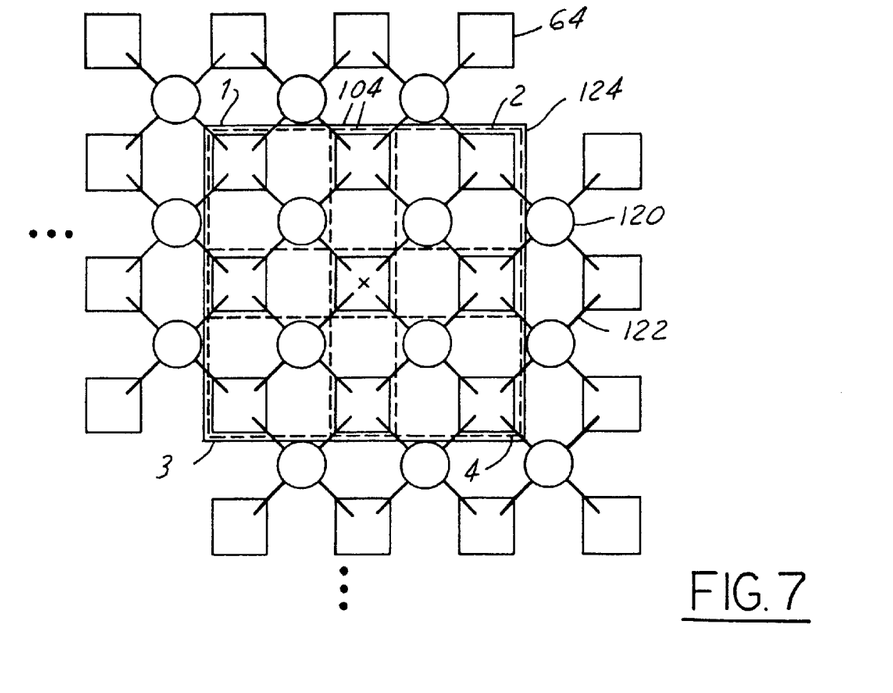
FIG. 7 is a block diagrammatic view of a multipatch antenna of a mobile satellite payload in accordance with the present invention.

Referring now also to FIG. 7, a block diagrammatic view of the multipatch antenna 62 having array elements 104 is shown. The grouping networks 102 are represented by the center nodes 120 having electrical connections 122. Each patch 64 may be used four times for each of four different array elements 104. For example patch X is part of four different array elements 1, 2, 3, 4 within a grouping network 102. Since there are no hybrids combining the patches 64 there is no signal to noise degradation. The array elements 104 share adjacent patches 64, which may be referred to as overlapping of the patches 64. The overlapping of patches 64 increases the efficiency of each patch 64. The overlapping of patches 64 in combination with the elimination of hybrids also decreases the dynamic range required for each A/D converter 78. Therefore the space between array elements 104 is equal to the space between patches 64. This spacing prevents grating lobes. Also since the patches 64 are digitally controlled the axial ratio is improved to approximately less then 0.2 db. Furthermore, since the received communication signals 16 are transformed into digital baseband signals 76 and combined digitally the receiving circuit 61 may be easily calibrated and recalibrated.

Figure 8:
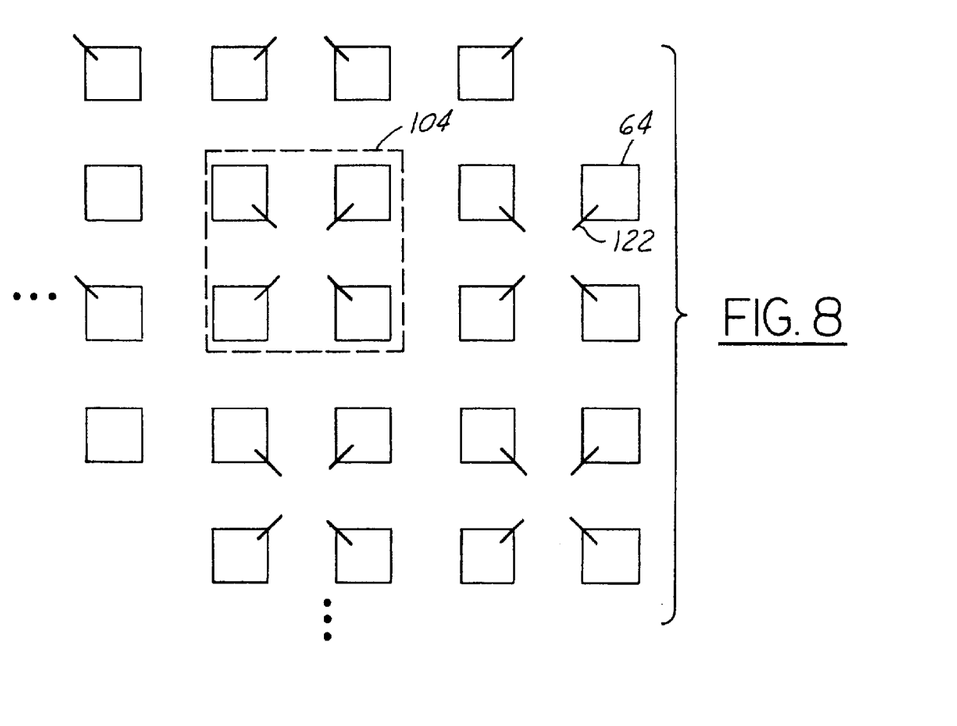
FIG. 8 is a block diagrammatic view of clocking groups of patches in accordance with the present invention.

Referring now to FIG. 8, a block diagrammatic view of clocking array elements 104 in accordance with the present invention is shown. The array elements 104 are clocked using preferably a satellite payload internal clock for receiving communication signals 16. Since adjacent array elements share patches 64 the array elements 104 are timed as to prevent more than one array element 104 from using the same patch 64 at the same time. The electrical connections 122 show an example of a preselected set of array elements receiving communication signals 16 for a particular time interval. The preselected combination of array elements shown is meant to be an example of a possible combination for a particular time interval. An infinite combination of array elements may be selected and used at various time intervals.

Figure 9:
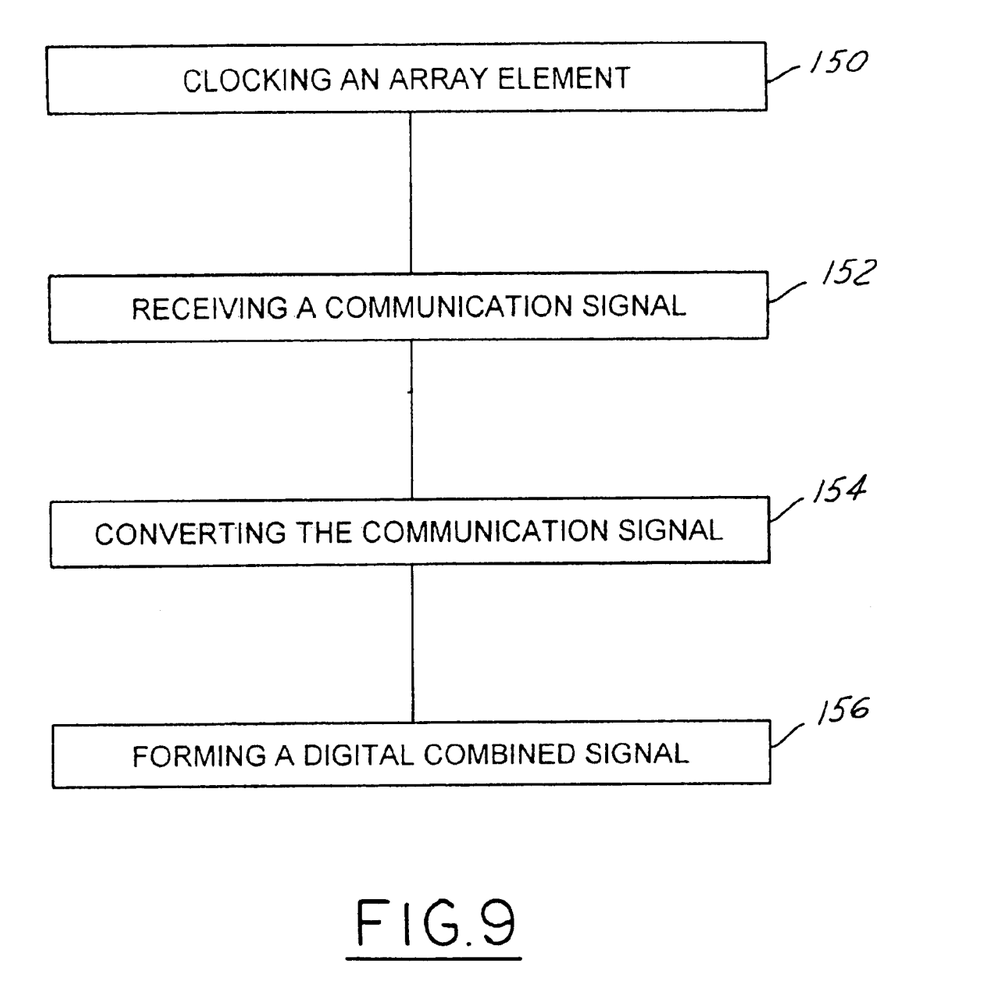
FIG. 9 is a flow chart illustrating a method of digitally controlling received signals within a high altitude communication device according to the present invention.

Referring now to FIG. 9, a flow chart illustrating a method of digitally controlling received signals 70 within the satellite payload 58 is shown.

In step 150, the array elements 104 are clocked to receive communication signals 66 at selected time intervals.

In step 152, the preselected array elements 104 receive the communication signals 66 for a particular time interval.

In step 154, the communication signals 66 are converted into received signals 70 by the LNAs 68.

In step 156, the grouping networks 102 transform the received signals 70 into digital baseband signals 76, which are digitally converted into digital combined signals 106 by the digital network 80.

The above-described invention, by eliminating the hybrids and combined networks, not only reduces the number of components in the satellite payload but also reduces the amount of signal loss. The reduction of the number of mobile satellite payload components may reduce weight, costs, and hardware of the mobile satellite payload. Furthermore by overlapping and orienting the patches in accordance with the present invention eliminates grating lobes and optimizes satellite payload axial ratio.

The above-described sampling method, to one skilled in the art, is capable of being adapted for various purposes and is not limited to the following applications: a ground based mobile terminal, base stations, or any other terrestrial electronic or communication devices that receive or transmit signals. The above-described invention may also be varied without deviating from the true scope of the invention

What is claimed is:

1. A high altitude communication device comprising:

a first array element comprising a plurality of patches for receiving communication signals;

a second array element comprising a plurality of patches for receiving communication signals, said second array element having at least one patch from said first array element;

at least one grouping network selecting said first array element for a first time interval and selecting said second array element for a time interval after said first time interval to convert and form digital combined signals from said communication signals.

2. A system as in claim 1 wherein said grouping network further comprising a plurality of filters.

3. A system as in claim 1 wherein said grouping network is part of a solid-state electrical circuit.

4. A system as in claim 1 wherein said plurality of grouping networks further comprise:

a plurality of low noise amplifiers electrically coupled to said first array element, said low noise amplifiers converting said communication signals to received signals;

a plurality of downconverters electrically coupled to said plurality of low noise amplifiers, said downconverters converting received signals to baseband signals;

a plurality of analog-to-digital converters electrically coupled to said plurality of downconverters, said analog-to-digital converters transforming said baseband signals to digital baseband signals; and a digital network electrically coupled to said plurality of analog-to-digital converters, said digital network transforming said digital baseband signals into said digital combined signals.

5. A system as in claim 4 wherein said digital network further comprises:

a strip-line electrically coupled to a group of analog-to-digital converters selected from said plurality of analog-to-digital converters;

a plurality of polarizers electrically coupled to said strip-line, said polarizers converting said digital baseband signals into polarized signals; and a plurality of elements electrically coupled to said plurality of polarizers, said elements summing said polarized signals to form said digital combined signals.

6. A system as in claim 4 wherein said digital network further comprises a digital beam former.

7. A system as in claim 4 wherein said digital network further comprises a plurality of filters.

8. A system as in claim 4 wherein said digital network is part of a solid-state electrical circuit.

9. A system as in claim 1 wherein spaces between patches in said plurality of patches is approximately equal to half a received signal wavelength.

10. A system as in claim 1 wherein space between said first array element and said second array element is approximately equal to a received signal wavelength.

11. A method of digitally controlling a received signal within a high altitude communication device comprising:
   clocking an array element comprising:
      selecting a first array element comprising a plurality of patches for receiving communication signals for a first time interval; and
      selecting a second array element comprising a patch within said first array element for receiving communication signals for a time interval after said first time interval;
   receiving a communication signal;
   converting said communication signal into a digital baseband signal; and
   forming a digital combined signal from said digital baseband signal.

12. A method as in claim 11 wherein converting communication signal into a digital baseband signal comprises:
   amplifying said communication signal to form a received signal;
   downconverting said received signal to form a baseband signal; and
   transforming said baseband signal into a digital baseband signal.

13. A method as in claim 11 wherein clocking an array element comprises selecting a plurality of array elements to receive a communication signal for a particular time interval.

14. A method as in claim 13 wherein transforming said baseband signal into a digital baseband signal further comprises filtering said baseband signal.

15. A method as in claim 13 further comprising filtering said digital baseband signal.

16. A method as in claim 11 wherein forming a digital combined signal from said digital baseband signal comprises:
   polarizing said digital baseband signal to form a polarized signal; and
   summing said polarized signal to form said digital combined signal.

17. A high altitude communication device comprising:
   a first array element comprising a plurality of patches for receiving communication signals;
   a second array element comprising a plurality of patches for receiving communication signals, said second array element having at least one patch from said first array element;
   a plurality of grouping networks, said plurality of grouping networks are electrically coupled to said first array element;
   said plurality of grouping networks selecting said first array element for a first time interval and selecting said second array element for a time interval after said first time interval to convert and form digital combined signals from said communication signals;
   a plurality of low noise amplifiers electrically coupled to said first plurality of patches, said low noise amplifiers converting said communication signals to received signals;
   a plurality of downconverters electrically coupled to said plurality of low noise amplifiers, said downconverters converting received signals to baseband signals;
   a plurality of analog-to-digital converters electrically coupled to said plurality of downconverters, said analog-to-digital converters transforming said baseband signals to digital baseband signals; and
   a digital network electrically coupled to said analog-to-digital converters, said digital network combining said digital baseband signals to form said digital combined signals.

18. A system as in claim 17 wherein said digital network further comprises:
   a strip-line electrically coupled to a group of analog-to-digital converters selected from said plurality of analog-to-digital converters;
   a plurality of polarizers electrically coupled to said strip-line, said polarizers converting said digital baseband signals into polarized signals;
   a plurality of elements electrically coupled to said plurality of polarizers, said elements summing said polarized signals to form digital combined signals; and
   a digital beam former electrically coupled to said plurality of elements.

* * * * *